Patented Nov. 7, 1933

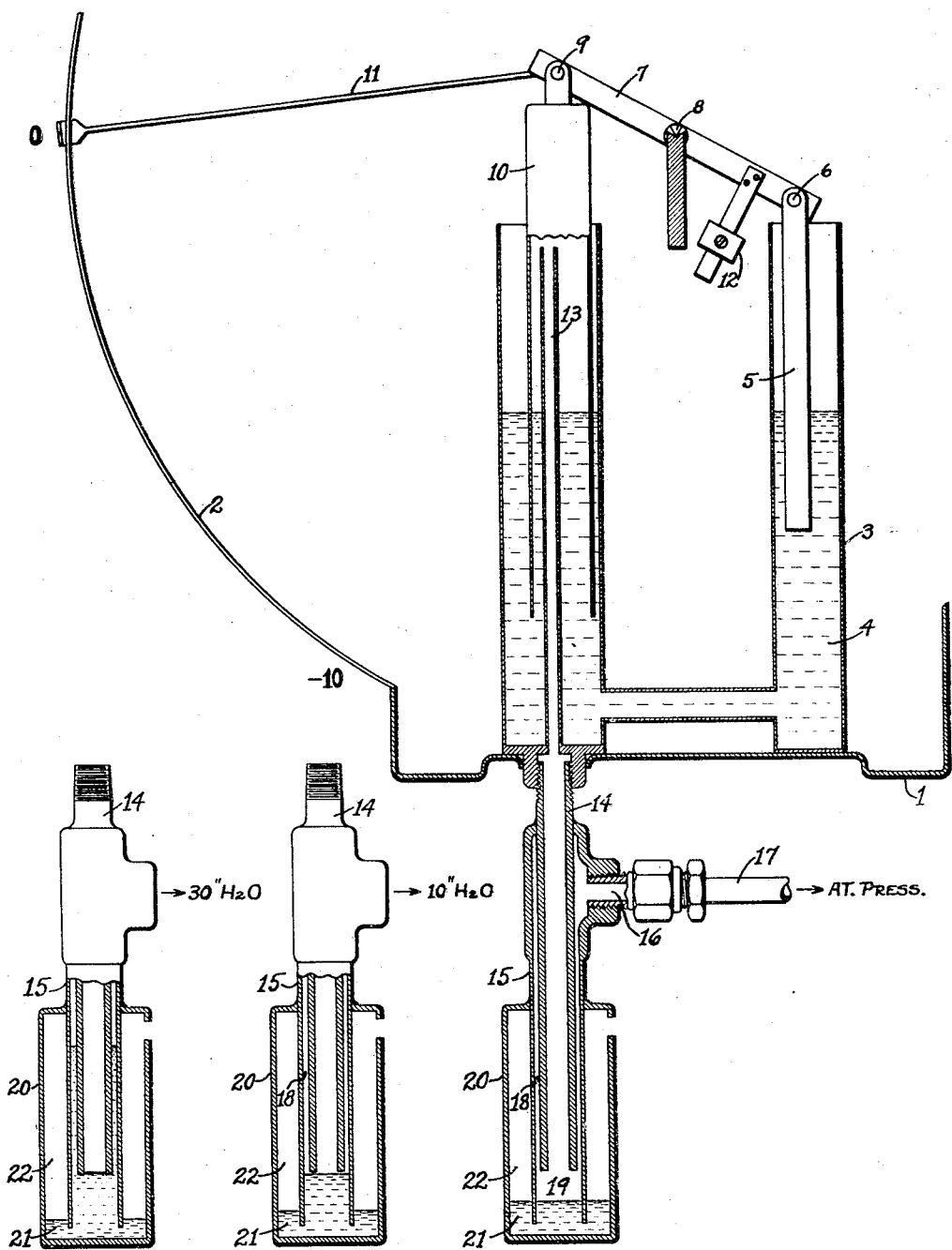

1,934,517

UNITED STATES PATENT OFFICE 1,934,517

DIFFERENTIAL PRESSURE PROTECTIVE DEVICE

Joseph C. Albright, Cleveland Heights, Ohio, assignor to Bailey Meter Company, a corporation of Delaware Application July 29, 1930. Serial No. 471,575

8 Claims. (Cl. 73—31)

My invention relates to apparatus responsive to variations in differential pressures, and in particular to devices for protecting such apparatus from the detrimental effects of an application of excessive pressure differentials.

Apparatus responsive to variations in differential pressures may be indicating or recording meters or the actuating parts of control and regulating equipment, or may be any apparatus which is responsive to variations in differential pressures to indicate the variation or intensity of pressures, or through movement or change in force accomplish a desired operation.

By preference, but in no wise as a limitation, I have chosen to illustrate and describe my invention as applied to indicating and recording meters, and with special reference to those of a type wherein a liquid sealed bell is subjected to a differential pressure and where upon variations in the pressure differential the position of the bell and the mechanism to which it is attached varies and is indicative of the intensity of the differential pressure.

In measuring the intensity of any single pressure it is really the difference in intensity between the pressure to be measured and that of the atmosphere surrounding the working parts of the measuring instrument, that is indicated, so that under all circumstances at least two pressures act upon the instrument, one of which may be atmospheric pressure.

In meters or differential pressure responsive devices the dimensions of the liquid sealed bells, stand-pipes, container and height of the sealing liquid all combine to determine the limits of pressure or pressure differential to which the meters or devices may be safely subjected. It is common practice to provide in the design a certain amount of protection against excessive pressure or pressure differentials, but frequently at time of design all of the operating conditions are not known.

The differential pressures may be a differential between a suction or negative pressure and the pressure of the atmosphere, or it may be a differential between two negative pressures, or between a pressure and a negative pressure, or between two pressures each greater than atmospheric pressure. It sometimes happens that one or more of the pressures applied are normally higher than atmospheric pressure, but in operation a condition might occur wherein a negative pressure would exist. The apparatus would be so designed and constructed that a certain negative pressure or a certain additional negative pressure could be applied safely. Beyond that amount, however, the sealing liquid may be drawn over into the connecting conduit, thereby losing some of the sealing liquid, and correspondingly changing the sealing level as well as stopping up the connecting conduit with the sealing liquid, tending toward an inaccurate or nonoperative condition.

Furthermore, upon change in differential pressure over a predetermined limit, the sealing liquid may be forced, splashed or otherwise lost from the meter, not only tending to change the accuracy and protective properties, but as in the use of oil as a sealing liquid, producing unsightly conditions on adjacent panels, meters etc.

One object of my invention is to provide a mechanism which will protect the differential responsive apparatus from the detrimental effects of an application of differential pressure in excess of the predetermined value.

Further objects will be obvious or become apparent from the description hereinafter.

As an example, but in no wise a limitation, I have chosen to illustrate and describe a preferred embodiment of my invention in connection with a draft or suction indicator. The indicator is responsive to a differential pressure between that of the atmosphere and a negative pressure, the normal range of the indicator being from 0 to −10 inches of water pressure, where zero represents atmospheric pressure in the conduit leading to the apparatus. The protective device is illustrated and described as protecting the draft indicator from detrimental effects of a negative pressure of −30 inches of water.

In the drawing:

Fig. 1 is an elevation, partly in section, of a draft indicator to which the invention has been applied. The arrangement of parts and sealing liquids are shown under a condition of atmospheric pressure or zero differential.

Fig. 2 is an elevation, partly in section, of a protective device representing the invention, corresponding in construction to the protective device shown in Fig. 1, but illustrated as being subjected to a negative pressure of a value corresponding to the maximum reading of the index of the draft indicator shown in Fig. 1.

Fig. 3 is a view similar to Fig. 2, but with the sealing liquid shown at levels corresponding to the application of a negative pressure of an amount equal to 300% of that applied to the protective device as shown in Fig. 2.

In Fig. 1 I have represented a draft indicator having an enclosing case designated at 1, part of which comprises an indicating scale or index 2. In the case 1 is positioned a chamber 3 containing a sealing liquid 4, for example a light oil having approximately the same density as water. For convenience, the chamber 3 has two interconnected compartments, in one of which is suspended a counterweight 5 vertically from a pivot 6 of an oscillatable beam 7 fulcrumed intermediate its ends at 8. From the other end of the beam 7, suspended from a pivot 9, is an inverted bell 10 hanging vertically in the other compartment of the chamber 3. Carried by the beam 7, oscillatable around the fulcrum 8, is a pointer 11 cooperating with the index 2 between the limits of travel designated on the index as 0 and —10.

The pointer 11 is at rest opposite the graduation designated 0 on the index 2 when a state of equilibrium exists in the system comprising the beam 7, the bell 10 and the counterweight 5, with an application of atmospheric pressure both within and without the bell 10. The bell 10 hanging vertically from the pivot 9 and the counterweight 5 hanging from the pivot 6 depend into the sealing liquid 4 in the chamber 3 for all travel of the bell beam system between the minimum and maximum graduations on the index 2.

The chamber 3 around the counterweight 5 and the bell 10 is open to the atmosphere, thus subjecting the outside of the bell 10 to atmospheric pressure, as is also the surface of the sealing liquid outside of the bell. That part of the area of the sealing liquid contained within the bell 10 is subjected to a suction or negative pressure applied through a standpipe 13 rising from the bottom of the chamber 3 through the sealing liquid 4 to within the bell 10.

The differential pressure to which the bell-beam system is responsive is that existing on the surface of the sealing liquid 4 within the bell 10, and that upon the sealing liquid 4 without the bell 10. In the present arrangement the sealing liquid without the bell 10 is subjected to atmospheric pressure, whereas that within the bell 10 is subjected to a pressure transmitted through the standpipe 13.

As the applied differential varies, the position of the system comprising the beam 7 fulcrumed at 8, the bell 10, the counterweight 5 and the pointer 11 tends to shift or rotate around the fulcrum 8. A pendulum 12 is fastened to the beam 7, forming a means of stabilizing and calibrating the fulcrumed system.

With a variation in the applied differential, the pointer 11 moves over the index 2, coming to rest at a graduation indicative of the negative pressure applied through the standpipe 13. A change in the level of the sealing liquid on the inside and the outside of the bell 10 results, and both the counterweight 5 and the bell 10 depend into the sealing liquid 4 a varying amount, but in the present design always having the same cross-sectional area of metal below the surface of the liquid to counteract any buoyancy effect.

Below the casing 1 is shown in sectional elevation the differential pressure protective device embodying the invention, comprising a tube 14 threaded or otherwise fastened in pressure conducting relation with the standpipe 13 and open at its lower end to the interior of a surrounding tube 15, sealed at its top to the tube 14, extending below the tube 14 and open at its lower end, and provided toward the upper end with an opening 16 to a conduit 17 through which is transmitted the negative pressure to be indicated on the index 2 of the draft indicator.

An annular space exists between the tube 14 and the tube 15, designated at 18, which has a cross-sectional area approximately one-fourth of that of the space 19, the interior of the tube 15.

A third tube 20 sealed at the top to the tube 15, open to the atmosphere toward its upper end and closed at the bottom below the lower end of the tube 15, forms a container open to the atmosphere for a sealing liquid designated at 21, preferably mercury or a liquid of greater density than that of the sealing liquid 4 of the draft indicator. The annular space 22 between the tube 15 and the tube 20 has a cross-sectional area of an approximate value four times that of the area of the space 19.

The distance that the tube 15 extends beyond the lower end of the tube 14, and the distance between the end of the tube 15 and the bottom of the chamber formed by the tube 20, as well as the amount of the sealing liquid 21 and its level under atmospheric pressure conditions, are all determined upon design to take care of the maximum value of the index 2, and the maximum excessive negative pressure protection desired. The sealing liquid 21 forms a seal for the tube 15 from atmospheric pressure existing in the annular chamber 22.

The annular chamber 18 formed by the tubes 14 and 15 communicates with the chamber 19 below the end of the tube 15 and is closed off at the bottom by the sealing liquid 21. It is open, however, by means of the conduit 17 to an applied negative pressure.

In operation, Fig. 1 shows the draft indicator with the protective device attached and the system subjected to atmospheric pressure on the surface of the sealing liquid 21, the sealing liquid 4 and through the conduit 17. The draft indicating mechanism comprising the bell 10, the beam 7, the counterweight 5 and the pointer 11, fulcrumed at 8, is in static equilibrium with the pointer 11 lying opposite the graduation 0 on the index 2. The sealing liquid 4 and the sealing liquid 21 have each assumed a hydrostatic level in the various chambers to which they respectively have communication.

In Fig. 2 is shown a condition wherein a negative pressure has been applied through the conduit 17 to the opening 16, of a value of —10 inches of water, which is the maximum value shown on the index 2 of the draft indicator. This negative pressure transmitted through the conduit 17, the opening 16, the annular chamber 18, through the connecting tube 14 and the standpipe 13, is effective to the inside of the bell 10, and on the surface of the sealing liquid 4 within the bell 10, causing the bell to move downward, the sealing liquid within the bell to rise, and the sealing liquid without the bell to fall. If the mechanism is in proper calibration the beam 7, fulcrumed at 8, lifts the counterweight 5 through the force developed by the negative pressure acting upon the bell 10, and the pointer 11 is moved over the index 2 from the graduation designated 0 to that designated —10 inches of water.

While the sealing liquid 4 within the bell 10 has been lifted due to the negative pressure applied through the standpipe 13, it has not risen to a point where it would overflow into the standpipe 13, nor has the liquid on the outside of the bell 10 within the chamber 3 fallen to a point where it would unseal around the lower edge of the bell 10. However, such conditions might occur if an excessive negative pressure were applied through the standpipe 13. For protection against such detrimental effects of an over-application of negative pressure, the invention is applied.

Referring to Fig. 2, the application of a negative pressure of —10 inches of water through the conduit 17 to the opening 16 of the protective device has been effective upon the surface of the sealing liquid 21, to the end that that part of the sealing liquid contained in the annular chamber 22 has fallen a certain amount from its hydrostatic level, and that part contained in the chamber 19 has been lifted from its hydrostatic level an amount in the ratio of the cross-sectional areas of the chamber 19 to the annular chamber 22, or approximately four times as much as the fall in the chamber 22. The sealing liquid in the chamber 19 has very nearly reached a point of contact with the lower end of the tube 14.

Mercury, or a liquid of greater density than the sealing liquid 4, is preferably used as the sealing liquid 21, so that the total change in elevation of the liquid within the chamber 19 plus that within the chamber 22 is comparatively small, compared with the corresponding change in level of the sealing liquid 4 in the draft indicator proper.

As will be seen from Fig. 2, a further increase in negative pressure applied through the conduit 17 to the annular space 18 effective upon the level of the sealing liquid 21 contained in the chamber 19 will cause the sealing liquid to rise to a point where it is in sealing contact with the lower end of the tube 14, thus closing off passage of the negative pressure to the interior of tube 14, to the standpipe 13 and to the underside of the bell 10, to the end that a negative pressure of an intensity beyond that indicated as the maximum graduation of the index 2 will not be applied to the underside of the bell 10.

It will be seen that were it not for the protective device embodying the invention applied to the draft indicator, a further negative pressure applied through the standpipe 13 would cause a greater rise of the sealing liquid 4 within the bell 10 and eventually the sealing liquid would either run over into the standpipe 13 or seal would be broken around the bottom of the bell 10, in any event, a detrimental condition would exist. It is to prevent any such occurrence that by my invention I seal off entrance of excessive negative pressure from the conduit 17 to the standpipe 13, and in turn to the interior of the bell 10.

In Fig. 3 I have shown a condition wherein the negative pressure in the conduit 17 has increased to a value of —30 inches of water, or 200% greater than the maximum indication of the index 2 of the draft indicator, a condition which would, without the invention, result in damage or detrimental effect upon the draft indicator. The application of a negative pressure of —30 inches of water through the opening 16 to the annular chamber 18 raises the sealing liquid 21 in the chamber 18 by an amount in a ratio of areas of the chamber 18 with that of the chamber 22, whereby the rise in the chamber 18 is approximately 16 times as great as the fall in the chamber 22. The design is such that there is still sufficient sealing liquid in the chamber 22 to prevent seal being broken around the bottom of the tube 15.

By the proper proportioning of the areas of the annular chamber 18, the chamber 19 and the annular chamber 22, will be accomplished a desired change in elevation of the sealing liquid 21 before sealing off communication with the standpipe 13, and to take care of a desired protective value.

It is apparent that I have invented an apparatus whereby a liquid sealed bell mechanism can be protected against the detrimental action of an over-application of negative pressure by effectively sealing off entrance to the liquid sealed bell from the negative pressure when the negative pressure has reached a predetermined value.

It is equally apparent that my invention might be embodied in an indicating or recording meter wherein the bell or bells would be subjected to other than atmospheric pressure on the outside. For instance, the bell might be sensitive to a differential between two negative pressures, or between a negative pressure and a positive pressure, or between two positive pressures, but in any event the invention applies to a protection against the application of an excessive pressure or differential pressure, regardless of whether the liquid sealed bells were used in connection with an indicating or recording meter, or with apparatus for control or regulating, or other purpose.

Nor is it necessary that liquid sealed bells be used, as the apparatus to be protected might comprise pistons, diaphragms, expansible metal bellows, or any construction wherein detrimental effects might be experienced upon the application of a differential pressure of a magnitude beyond a predetermined value.

By the terms "excessive pressure" or "if the pressure exceeds a predetermined value" as used in the claims appended hereto, I mean that the value of pressure or pressure differential has passed beyond a predetermined value in either a positive or negative direction, and not that the pressure on an absolute basis is greater in value than the predetermined value. The pressure or pressure differential may exceed a predetermined value, either by becoming greater than the value or by becoming less than the value, but in either case, goes beyond the predetermined value in one direction.

It is expressly understood that by illustrating and describing one embodiment of my invention, I have not limited my invention other than as stated in the claims in view of prior art.

What I claim as new and desire to secure by Letters Patent of the United States, is:—

1. The combination with apparatus responsive to variations in pressure differential, of a protective device comprising a chamber to which may be applied a negative pressure, a second chamber in liquid-sealed communication with said first-named chamber and in direct communication with the atmosphere, a third chamber communicating with said apparatus and depending into said first-named chamber in a manner such that upon the application to said first-named chamber of a negative pressure in excess of a predetermined value, the sealing liquid will seal off communication between said first-named chamber and said third-named chamber, to the end that said excessive negative pressure will not be effective upon the apparatus.

2. In combination, a pressure-responsive meter comprising a chamber, a bell positioned in said chamber, and a sealing liquid for the bell in said chamber; a conduit for transmitting pressure variations to the meter, and a protective device in pressure-conducting relation with said conduit and said meter whereby said device normally allows a transmission of pressure from the conduit to the meter, said protective device including a liquid which seals off communication between the conduit and the meter if the pressure exceeds a predetermined value.

3. The combination with apparatus responsive to variations in pressure differential, of a conduit for transmitting pressure variations to the apparatus, and a protective device in pressure-conducting relation with said conduit and said apparatus whereby said device normally allows a transmission of pressure from the conduit to the apparatus, said protective device including a liquid which seals off communication between the conduit and the apparatus if the pressure exceeds a predetermined value.

4. In combination, a pressure differential responsive apparatus, a conduit for transmitting pressure variations to the apparatus, and a protective device in pressure conducting relation with said conduit and having passages for allowing normally a transmission of pressure from the conduit to the apparatus, said protective device comprising a liquid which upon an increase in pressure differential exceeding a predetermined value seals off communication with said apparatus.

5. The combination with a conduit normally subjected to pressures of variable magnitude, of a device for limiting the magnitude of the pressure within said conduit comprising a chamber connected to the source of pressure and to said conduit; a liquid within said chamber responsive to variations in the magnitude of the pressure and adapted to seal the connection between said conduit and said chamber when the pressure reaches a predetermined magnitude.

6. The combination with a conduit normally subjected to pressures of variable magnitude, of a device for limiting the magnitude of the pressure within the conduit comprising a pair of communicating chambers, a connection from one of the chambers to the source of said pressure, said conduit depending into the chamber and having an open end therein, a liquid within the chamber responsive to variations in the magnitude of said pressure and adapted to seal the open end of said conduit at a predetermined magnitude of said pressure.

7. In combination with a conduit for transmitting pressures, of a second conduit for transmitting pressures to said first-named conduit from the source of said pressure, and a device interposed between said conduits for limiting the magnitude of the pressure to which said first-named conduit is subjected, comprising a U-tube having a pair of communicating legs, one of said legs open to the atmosphere and the other connected to said first- and second-named conduits, a liquid within said U-tube responsive to the difference in atmospheric pressure and the pressure within the second-named conduit, and adapted to seal the connection with said first-named conduit at a predetermined difference between the pressure of the atmosphere and the pressure within the second-named conduit.

8. The combination with pressure responsive apparatus normally responsive to the difference between two pressures, of a device for limiting the magnitude of the pressures to which said apparatus is subjected, comprising a pair of communicating chambers, one of said chambers connected to the source of one of said pressures, the other of said chambers connected to the source of the second of said pressures and to said apparatus, a liquid within said chambers responsive to variations in the difference of said pressures and adapted at a predetermined magnitude of said difference to seal the connection to said apparatus.

JOSEPH C. ALBRIGHT.